(12) United States Patent
Hoffmann et al.

(10) Patent No.: US 8,657,978 B2
(45) Date of Patent: Feb. 25, 2014

(54) METHOD FOR PRODUCING A TRANSPORT/DRIVE BELT

(75) Inventors: Dieter Hoffmann, Lehrte/Aligse (DE); Thomas Kaemper, Burgwedel (DE)

(73) Assignee: Forbo Siegling GmbH, Hannover (DE)

( * ) Notice: Subject to any disclaimer, the term of this patent is extended or adjusted under 35 U.S.C. 154(b) by 313 days.

(21) Appl. No.: 12/744,129

(22) PCT Filed: Nov. 21, 2007

(86) PCT No.: PCT/DE2007/002111
§ 371 (c)(1),
(2), (4) Date: May 21, 2010

(87) PCT Pub. No.: WO2009/065367
PCT Pub. Date: May 28, 2009

(65) Prior Publication Data
US 2010/0243130 A1 Sep. 30, 2010

(51) Int. Cl.
B29C 43/44 (2006.01)
B32B 38/10 (2006.01)
B65G 15/56 (2006.01)
F16G 1/16 (2006.01)

(52) U.S. Cl.
USPC ............ 156/137; 156/219; 156/289; 264/316

(58) Field of Classification Search
USPC .......... 156/137, 219, 220, 289; 264/248, 257, 264/316; 198/847; 474/266, 268
See application file for complete search history.

(56) References Cited

U.S. PATENT DOCUMENTS

| | | | | |
|---|---|---|---|---|
| 2,984,594 A * | 5/1961 | Runton | ......................... | 198/847 |
| 3,038,833 A * | 6/1962 | Glover | ......................... | 156/322 |
| 3,041,661 A * | 7/1962 | Elliott | ........................... | 264/284 |
| 3,556,892 A * | 1/1971 | Hilliard | ....................... | 156/164 |
| 3,574,022 A | 4/1971 | Lampert | | |
| 4,160,798 A * | 7/1979 | Price et al. | .................... | 264/213 |
| 5,244,083 A | 9/1993 | Arnold | | |
| 2001/0025769 A1 | 10/2001 | Roet | | |
| 2005/0086916 A1* | 4/2005 | Caron | ............................ | 55/382 |

FOREIGN PATENT DOCUMENTS

| | | |
|---|---|---|
| DE | 1237768 B | 3/1967 |
| DE | 1289300 B | 2/1969 |
| EP | 1129966 A1 | 9/2001 |
| GB | 733338 A | 7/1955 |
| GB | 1030354 A | 5/1966 |
| WO | WO 9511795 A1 | 5/1995 |

* cited by examiner

Primary Examiner — Michael Tolin
(74) Attorney, Agent, or Firm — Leydig, Voit & Mayer, Ltd.

(57) ABSTRACT

A method for forming a longitudinal edge region of a transport/drive belt having at least two layers of a thermoplastic material and at least one layer of a woven fabric web includes positioning a mat at one longitudinal edge of the transport/drive belt. The method further includes transferring heat and pressure to the transport/drive belt so as to melt and merge at least a region of the at least two layers of thermoplastic material without adding any additional material, solidifying the at least two layers of thermoplastic material, and removing the mat.

8 Claims, 1 Drawing Sheet

METHOD FOR PRODUCING A TRANSPORT/DRIVE BELT

CROSS REFERENCE TO PRIOR APPLICATION

This application is a U.S. National Phase Application under 35 U.S.C. §371 of International Application No. PCT/DE2007/002111, filed on Nov. 21, 2007. The International Application was published in German on May 28, 2009 as WO 2009/065367 under PCT Article 21 (2).

The invention relates to a method for producing a transport/drive belt comprising at least one layer of a thermoplastic material and at least one layer of a woven fabric web.

BACKGROUND

Such belts which are generally planar have many uses as conveyor belts or also as drive belts. In this instance, in particular the edges at the longitudinal edges of the extended belts are subject to a high mechanical load and stress during use, so that the peripheral edges of the belt are often unprotected against environmental influences with prolonged use and can be penetrated by particles of dirt and germs. This is unacceptable in all commercial fields involving the production, processing and sale of foodstuffs, in particular with regard to good hygiene practice and the HACCP concept (Hazard Analysis and Critical Control Point).

DE 1 237 768 discloses a production method for conveyor belts, wherein a carrier strip with a material strip adhesively-bonded thereto is moved towards and placed around an edge of a belt. Subsequently, the elastomer of the material strip is melted and formed by pressing heated plates on the upper and lower side of the conveyor belt. The basic notion of this invention involves fitting additional elastomer material at the edge of the conveyor belt and bonding it into a unit with the elastomer material of the conveyor belt under the action of temperature and pressure.

DE 1 289 300 discloses a conveyor belt which has a core with tensile strength comprising a plurality of woven fabric inserts which are connected by means of connecting layers of thermoplastic material. The warp threads of the woven fabric insert comprise, in the edge zones of the fabric, a thermoplastic material which melts under the action of temperature and pressure and bonds to form a unit with the thermoplastic material of the connection layers. However, these thermoplastic warp threads have a low level of tensile strength with the result that they are undesirable in practice. Such warp threads are therefore often used only with specific spacing, so that the edge in this region can be separated which, however, makes flexible production completely impossible.

GB 1,030,354 and U.S. Pat. No. 5,244,083 describe methods wherein conveyor belts comprise a plurality of layers, which have different widths in the peripheral regions. The widest peripheral layer is folded around the other material layers. However, with belts which are produced in this manner, it is also possible for the multilayer structure to become delaminated or frayed.

SUMMARY OF THE INVENTION

An aspect of the invention is to make it possible to produce a transport/drive belt with a sealed and durable edge in a simple and cost-effective manner.

With a production method of the type described in the introduction, there is provision according to the invention for a mat to be positioned at least at one longitudinal edge of the transport/drive belt in order to transfer heat and/or pressure to the transport/drive belt so that exclusively the thermoplastic material of the transport/drive belt is melted and formed at least in regions without any additional material and subsequently, after the thermoplastic material has solidified again, the mat is removed from the longitudinal edge of the transport/drive belt.

The central notion of the present invention is that the thermoplastic material particularly of the plurality of belt layers which is already available, for example, PVC, PU, PE, PA, PP or polyolefins, is formed into a uniform and sealed belt edge. Removal of material or fitting of additional material is therefore not required. With the transport/drive belt produced in this manner, the resolidified material forms a unit at the edge so that the plurality of layers cannot become separated or loose.

In order not to impair the tensile strength which is determined substantially by the material properties of the woven fabric insert, there is provision according to the invention for the melting temperature of the material of the woven fabric web to be higher than the melting temperature of the thermoplastic material.

In a production method according to the invention, the melting and forming of the thermoplastic material is preferably carried out in a temperature range of between 120° C. and 200° C., more preferably in a temperature range of between 160° C. and 180° C.

In order to reliably prevent adhesion of the thermoplastic material in the molten and/or resolidified state, it is possible to provide, between the transport/drive belt and the mat, whilst the method according to the invention is being carried out, a separation medium, for example, a separation paper or a separation film.

So that the formed edge surface has a desired surface structure, for example, with a rough/smooth or matt/gloss property, the separation medium can be provided with a surface structure which is impressed during melting and forming of the surface of the thermoplastic material.

Advantageously, in a method according to the invention, the mat is constructed as a glass fibre mat.

The mat can readily be removed from the formed belt together with the separation medium if the mat has a woven fabric which is coated with anti-adhesive agent.

BRIEF DESCRIPTION OF THE DRAWINGS

Various configurations of the invention are permitted. The basic notion of the method according to the invention is explained in greater detail below by way of example with reference to an embodiment and the appended Figures, in which.

DETAILED DESCRIPTION

Figure 1:
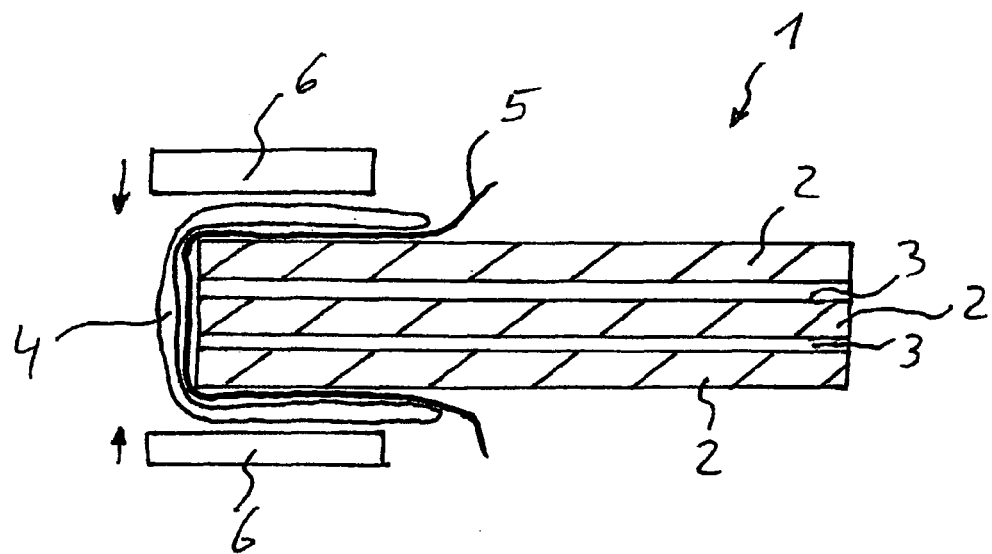
FIG. 1 is a schematic cross-section of a transport/drive belt which comprises a plurality of layers, prior to the melting and forming operation.

The illustration of FIG. 1 shows a transport/drive belt 1 which has a plurality of layers of thermoplastic material 2, which are arranged in a substantially parallel manner one above the other. Between each two layers of thermoplastic material 2, for example, polyvinyl chloride, polyurethane, polyethylene, polyamide, polypropylene and/or a polyolefin, a woven fabric web 3 is inserted as an intermediate layer. In order to simplify the illustration, the individual threads, that is to say, the weft or warp threads of the woven fabric web 3, are drawn in a non-separated state. It is important that they do not protrude beyond the thermoplastic material 2.

Around one of the two edges of the transport/drive belt 1, the left edge in the plane of the drawing, a sack or pocket-like mat 4 is moved towards and placed around the belt edge. Between the mat 4 and the thermoplastic material 2 of the transport/drive belt 1, there is arranged a separation paper 5 which is also guided around the entire edge from an upper side to the lower side.

For the actual forming operation, two heating plates 6 are placed at the upper side and the lower side of the arrangement comprising the transport/drive belt 1, separation paper 5 and mat 4. Using the heating plates 6, a temperature and/or pressure action is transmitted to the arrangement described above. The temperature is selected in such a manner that, although the thermoplastic material 2 in the edge region melts, the woven fabric webs 3 whose material has a higher melting temperature do not.

After the thermoplastic material 2 has melted, it is formed by the pressure applied so that the molten masses of the plurality of layers at least partially merge. The melting of the thermoplastic material 2 is carried out in particular in a temperature range of between 160° C. and 180° C. In place of the illustrated heating plates 6, it is also possible to position a high-grade steel film as a heating means around the arrangement.

Figure 2:
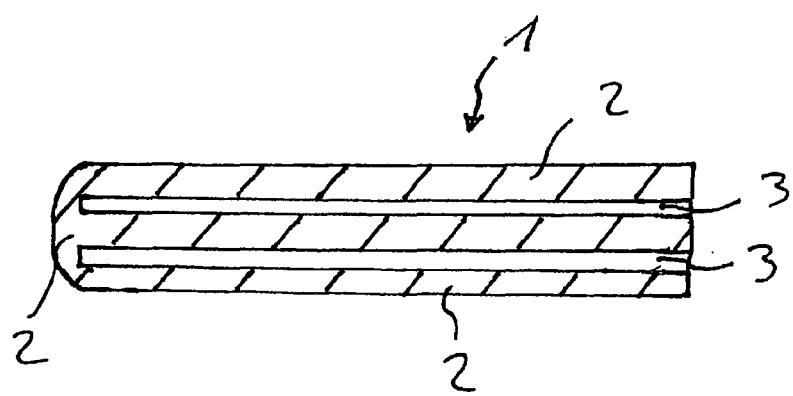
FIG. 2 illustrates the transport/drive belt with a longitudinal edge formed according to the invention.

FIG. 2 illustrates the transport/drive belt 1 of FIG. 1 after the forming operation with resolidified thermoplastic material 2. In FIG. 2, it can clearly be seen that the forming operation carried out in accordance with the invention has no significant influence on the woven fabric webs 3. However, it can also clearly be seen at the processed edge of the transport/drive belt 1 that the thermoplastic material 2 which was originally in several layers forms a unit with a rounded edge after the forming operation.

For clarity, in FIGS. 1 and 2, only the longitudinal edge illustrated at the left-hand side in each case is processed and formed. The longitudinal edge drawn at the right-hand side in each case remains unchanged and the separated layers of the various materials can clearly be seen. For the use of the transport/drive belt, however, there is preferably provision for both longitudinal edges to be correspondingly formed and sealed.

The invention claimed is:

1. A method for forming a longitudinal edge region of a transport or drive belt, the method comprising:
   providing a belt having a plurality of layers including at least one layer of a thermoplastic material and at least one layer of a woven fabric web, the plurality of layers defining a longitudinal edge of the belt;
   positioning a mat around the longitudinal edge of the belt with a separation paper between the belt and the mat that is disposed around the entire longitudinal edge from an upper side to a lower side;
   transferring heat and pressure to the belt using a steel film as a heating device so as to exclusively melt the thermoplastic material and form regions of the belt without adding any additional material;
   solidifying the thermoplastic material; and
   removing the mat from the belt.

2. A method for forming a longitudinal edge region of a transport or drive belt, the method comprising:
   providing a belt having a plurality of layers including at least two layers of a thermoplastic material and at least one layer of a woven fabric web, the plurality of layers defining a longitudinal edge of the belt;
   positioning a mat around the longitudinal edge of the belt with a separation paper between the belt and the mat that is disposed around the entire longitudinal edge from an upper side to a lower side;
   transferring heat and pressure to the belt using a steel film as a heating device so as to exclusively melt and merge at least a region of the at least two layers of thermoplastic material so as to enclose the woven fabric web at the edge of the belt without adding any additional material;
   solidifying the at least two layers of thermoplastic material; and
   removing the mat.

3. The method as recited in claim 2, wherein a melting temperature of the woven fabric web is higher than a melting temperature of the thermoplastic material.

4. The method as recited in claim 2, wherein the melting is performed at a temperature range of between 120° C. and 200° C.

5. The method as recited in claim 2, wherein the melting is performed at a temperature range of between 160° C. and 180° C.

6. The method as recited in claim 2, wherein the separation paper includes a surface structure and wherein the melting includes impressing the surface structure of the separation paper on the thermoplastic material of the belt.

7. The method as recited in claim 2, wherein the mat includes a glass fiber mat.

8. The method as recited in claim 2, wherein the mat includes a woven fabric coated with an anti-adhesive agent.

* * * * *